(12) United States Patent  
Kang (10) Patent No.: US 7,117,022 B2  
(45) Date of Patent: Oct. 3, 2006

(54) CDMA BASE STATION SYSTEM

(75) Inventor: Seok Moon Kang, Kyoung Sang buk-do (KR)

(73) Assignee: LG Electronics Inc., Seoul (KR)

( * ) Notice: Subject to any disclaimer, the term of this patent is extended or adjusted under 35 U.S.C. 154(b) by 677 days.

(21) Appl. No.: 09/735,547

(22) Filed: Dec. 14, 2000

(65) Prior Publication Data

US 2001/0016503 A1   Aug. 23, 2001

(30) Foreign Application Priority Data

Dec. 15, 1999   (KR) ............................... 1999-57877

(51) Int. Cl.
*H04B 1/38* (2006.01)
(52) U.S. Cl. .................. 455/574; 455/424; 455/522
(58) Field of Classification Search ............... 455/561, 455/67.11, 423, 424, 522, 562.1, 550, 115.1, 455/115 B, 127.1, 127.5, 131, 133, 134, 334, 455/338, 339, 341, 572, 573, 574
See application file for complete search history.

(56) References Cited

U.S. PATENT DOCUMENTS

| | | | | |
|---|---|---|---|---|
| 4,989,204 A | * | 1/1991 | Shimizu et al. ............. | 370/328 |
| 5,255,307 A | * | 10/1993 | Mizikovsky ............. | 455/432.1 |
| 5,423,071 A | * | 6/1995 | Hanninen ................ | 455/67.13 |
| 5,442,811 A | * | 8/1995 | Kobayashi et al. ...... | 455/67.11 |
| 5,768,689 A | * | 6/1998 | Borg ....................... | 455/67.14 |
| 5,890,056 A | * | 3/1999 | Garner et al. ........... | 455/67.11 |
| 5,978,659 A | * | 11/1999 | Kim ........................ | 455/67.11 |
| 6,112,070 A | * | 8/2000 | Katsuyama et al. ........ | 455/307 |
| 6,157,183 A | * | 12/2000 | Bradley ................... | 324/76.23 |
| 6,529,712 B1 | * | 3/2003 | Domino et al. ............... | 455/86 |
| 6,842,614 B1 | * | 1/2005 | Noe ........................... | 455/423 |

\* cited by examiner

*Primary Examiner*—Edward F. Urban
*Assistant Examiner*—Nhan T. Le
(74) *Attorney, Agent, or Firm*—Fleshner & Kim, LLP (57) ABSTRACT

A RF characteristic analyzer for a communications system including an input/output module, coupled to the communications system, a first analyzing circuit coupled to receive and analyze a transmission signal of the communications system through the input/output module, and a second analyzing circuit coupled to receive and analyze a reception signal of the communications system through the input/output module. Also included is an alarm circuit coupled to receive analyzed data from the first and second analyzing circuits, and to provide at least one alarm message according to the analyzed data.

27 Claims, 3 Drawing Sheets

CDMA BASE STATION SYSTEM

BACKGROUND OF THE INVENTION

1. Field of the Invention

The present invention relates to a code division multiple access (CDMA) base station system, and more particularly to a CDMA base station system which reduces the deterioration of call quality.

2. Background of the Related Art

Figure 1:
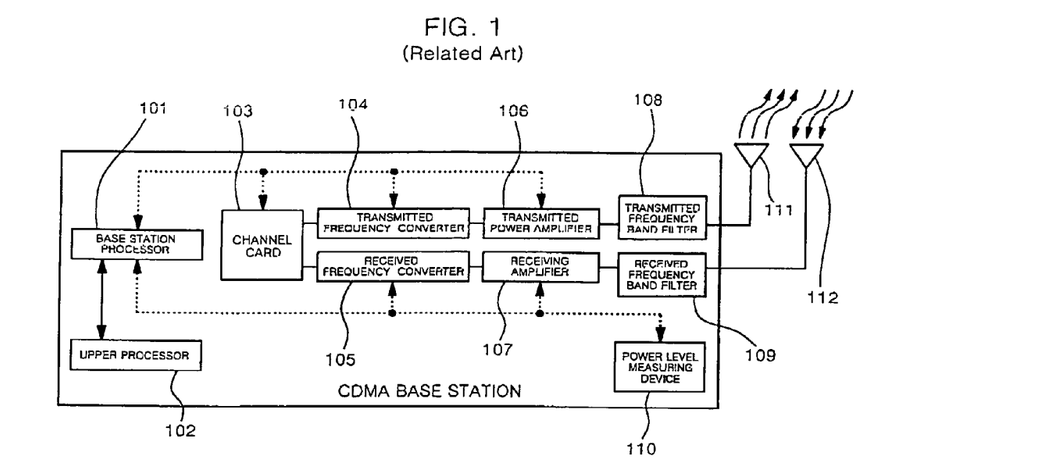
FIG. 1 is a block diagram illustrating the construction of a related art CDMA base station system.

FIG. 1 is a block diagram illustrating the construction of a related art CDMA base station system.

Referring to FIG. 1, the related art CDMA base station includes a base station processor 101 for taking charge of an interface in a base station and controlling peripheral boards. It further includes an upper processor 102 for taking charge of an interface between the base station and an exchange (not illustrated). The upper processor 102 is communicatively coupled to base station processor 101. Next, a channel card 103 is provided to modulate/demodulate signals transmitted/received from the base station.

The CDMA base station also includes a transmitted frequency converter 104 to convert a transmitted frequency into an allocated use frequency band, and a transmitted power amplifier 106 to amplify the signal to transmit at a rated power of the base station. A transmitted frequency band filter 108 is provided to allow only the allocated frequency band (i.e., the transmitted frequency band to be used) to pass through to the transmitting antenna 111.

The CDMA base station next includes a received frequency converter 105, to convert a received frequency into a frequency band used in the base station. A receiving amplifier 107 is coupled to the frequency converter 105 for amplifying a low-level signal from a terminal, and a received frequency band filter 109 is coupled to the receiving amplifier 107, and allows only the allocated frequency band to pass through. Finally, a power level measuring device 110 is provided to measure a power level of a final end (i.e., an output) of the base station.

An operation of the related art CDMA base station system as constructed above will now be described with reference to FIG. 1.

The operation of the related art CDMA base station is typically divided into three functions: (1) base station transmission; (2) base station reception; and (3) output signal strength detection.

First, during the transmitting function of the base station, the channel card 103, which controls the transmitted/received signal modulation and demodulation, modulates the transmitted signal of the CDMA base station. The modulated signal then passes through the transmitted frequency band filter 108 via the transmitted frequency converter 104. This is done to convert the transmitted signal into the frequency to be actually used (i.e., allocated use frequency). Next, after passing through the transmitted frequency converter 104, the signal passes through the transmitted power amplifier 106 to increase the transmission power to the rated power (i.e., the maximum power of the base station that can be transmitted within the range satisfying the characteristic of the base station).

The signal is then outputted from transmitted power amplifier 106 and passes through the transmitted frequency band filter 108, and then transmitted through the transmission antenna 111.

The receiving function of the CDMA base station is contrary to the transmission function. A signal is first received through a receiving antenna 112, and then passes through the received frequency filter 109. The filter 109 is used to ensure that only the allocated frequency band is outputted from the received frequency band filter 109. The signal, having passed through the received frequency band filter 109, is then amplified by the receiving amplifier 107 as much as the power of the received signal required by the CDMA base station. The thusly amplified signal is then is converted into a low frequency signal required by the CDMA base station through the received frequency converter 105.

The low frequency signal is then demodulated by the channel card 103 in charge of the transmitted/received signal modulation and demodulation.

Finally, the CDMA base station measures the strength of the current transmitted signal of the final end using the power level measuring device 110. The power level measuring device 110 detects the strength of the transmitted output, and reports the measured strength to the base station processor 101.

The related art CDMA base station has various problems. For example, according to the related art CDMA base station, the processor 101 simply confirms whether or not the power supply to the boards of the channel card 103, transmitted/received frequency converters 104 and 105, transmitted/received power amplifiers 106 and 107, transmitted/received frequency filters 108 and 109, etc., is in a normal state, or whether the cables connected among them are in a normal state.

The actual call quality, however, can be affected by the board operation characteristics other than the power supply to the boards. Despite this, no method of confirming the board characteristics beyond checking the power supply to the boards has been conventionally proposed.

As a result, the related art CDMA base station has no way to confirm the RF characteristics of the base station. Consequently, except for the reading of the final received power level, the RF characteristic of the base station cannot be recognized until a problem occurs and affects the call quality.

The above references are incorporated by reference herein where appropriate for appropriate teachings of additional or alternative details, features and/or technical background.

SUMMARY OF THE INVENTION

An object of the present invention is to provide a CDMA base station that substantially obviates problems caused by disadvantages in the related art.

It is another object of the present invention to provide a CDMA base station system that can minimize the deterioration of the call quality in a CDMA system.

It is another object of the present invention to provide a CDMA base station that is capable of analyzing in advance the characteristic inferiority of the boards constituting the CDMA base station.

In order to achieve at least these objects, in whole or in parts, there is provided a CDMA base station system comprising a channel card for modulating/demodulating a transmitted/received signal; a transmitting section for transmitting the signal outputted from the channel card to the outside; a receiving section for receiving a signal from the outside and transmitting the received signal to the channel card; a radio frequency (RF) characteristic analyzer for analyzing characteristics of the transmitting section and the receiving section by monitoring output signals thereof and transmitting a result of analysis to a base station processor; a first processor for interfacing among the channel card, the transmitting section, the receiving section, and the RF characteristic analyzer; a power level measuring device for measuring a power level of a final end of the base station, and transmitting the power level to the base station processor; and a second processor for interfacing between the first processor and an exchange.

In order to achieve at least these objects, in whole or in parts, there further is provided an RF characteristic analyzer comprising a first analyzing circuit for monitoring and analyzing the output signal of the transmitting section in real time; a second analyzing circuit for monitoring and analyzing the output signal of the receiving section in real time; an alarm circuit for receiving analyzed data from the first and second analyzing circuits, and generating an alarm message; an input/output circuit for transmission/reception of the signals and input/output of the alarm signal with the base station; and a power supply circuit for supplying a necessary power to the RF characteristic analyzer.

In order to achieve at least these objects, in whole or in parts, there is further provided an RF characteristic analyzer, having a first analyzing circuit, comprising a band rejection filter for eliminating a specified band signal; an analog-to-digital converting circuit for converting an analog signal passing through the band rejection filter into a digital signal; a low pass filter for passing therethrough only a low frequency among the converted digital signal; a differentiator for judging whether a strength of a signal outputted from the analog-to-digital converting circuit is increased or decreased; a sign changer for changing a sign of an output signal of the differentiator; an integrator for outputting a positive integer value if an output signal of the low pass filter is larger than a specified threshold value; and a logic gate for a logical operation of an output signal of the sign changer and an output of the integrator.

In order to achieve at least these objects, in whole or in parts, there is further provided an RF characteristic analyzer, having a second analyzing circuit, comprising a band pass filter for passing the specified band signal; an analog-to-digital converting circuit for converting an analog signal passing through the band pass filter into a digital signal; a low pass filter for passing therethrough only a low frequency among the converted digital signal; a differentiator for judging whether a strength of a signal outputted from the analog-to-digital converting circuit is increased or decreased; a sign changer for changing a sign of an output signal of the differentiator; an integrator for outputting a positive integer value if an output signal of the low pass filter is larger than a specified threshold value; and a logic gate for a logical operation of an output signal of the sign changer and an output of the integrator.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 2:
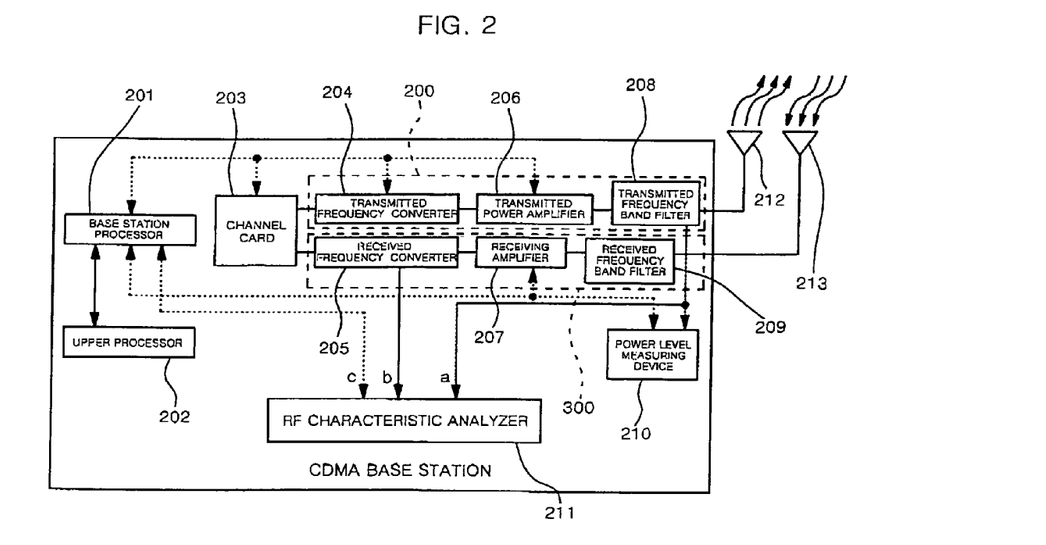
FIG. 2 is a block diagram illustrating the construction of a CDMA base station system according to a preferred embodiment of the present invention.

Referring to FIG. 2, the CDMA base station system according to a preferred embodiment of the present invention includes a base station processor 201 to take charge of an interface in a base station and control peripheral boards. It also includes an upper processor 202 communicatively coupled to the base station processor 201 for taking charge of an interface between the base station and an exchange (not illustrated). Next, a channel card 203 is provided to modulate/demodulate signals transmitted from/received by the base station.

A transmitted frequency converter 204 is provided to convert a transmitted frequency into an allocated use frequency band, and a transmitted power amplifier 206 is provided to amplify the signal to transmit at a rated power of the base station. The system also includes a transmitted frequency band filter 208, which passes therethrough only the allocated frequency band (i.e., the transmitted frequency band to be used).

On the receiving side, the base station system includes a received frequency converter 205, to convert a received frequency into a frequency band used in the base station. A receiving amplifier 207 is coupled to the received frequency converter 205 to amplify a low-level signal from a terminal. The system also includes a received frequency band filter 209, which passes therethrough only the allocated frequency band.

A power level measuring device 210 is included, and measures a power level of a final end of the base station, and an RF characteristic analyzer 211 included to monitor and analyze output signals of the transmitted frequency band filter and the received frequency converter. The RF characteristic analyzer 211 is configured to transmit a result of its analysis to the base station processor.

The operation of the CDMA base station system according to the present invention as constructed above will now be explained with reference to FIG. 2.

The operation of the CDMA base station is preferably divided into four functions: (1) base station transmission; (2) base station reception; (3) output signal strength detection; and (4) RF characteristic analysis.

First, during the transmitting function of the base station, the channel card 203, which controls the transmitted/received signal modulation and demodulation, modulates the transmitted signal of the CDMA base station. The modulated signal then passes through the transmitted frequency band filter 208 via the transmitted frequency converter 204. The frequency converter converts the transmitted signal to be transmitted into the proper frequency for use (i.e., the allocated use frequency). After the signal passes through the transmitted frequency converter 204, it passes through the transmitted power amplifier 206 to increase the transmitted power to the rated power (i.e., the maximum power of the base station that can be transmitted within the range satisfying the characteristic of the base station).

The signal outputted from transmitted power amplifier 206 next passes through the transmitted frequency band filter 208, which eliminates any unwanted frequencies from the signal, and is then transmitted through a transmission antenna 212.

The receiving function of the CDMA base station is contrary to the transmission function. Thus, a signal is received through the receiving antenna 213, and passes through the received frequency filter 209. Only the allocated frequency band is outputted from the received frequency band filter 209. The signal, having passed through the received frequency band filter 209, is next amplified by the receiving amplifier 207 as much as is required based on the power of the received signal and the power required by the CDMA base station. The thusly amplified signal is then converted into a low frequency signal through the received frequency converter 205. The signal is thus set at a frequency that is usable by the CDMA base station.

The signal converted into the low frequency is transmitted to and demodulated by the channel card 203.

The CDMA base station measures the strength of the current transmitted signal of the final end using the power level measuring device 210. The power level measuring device detects the strength of the transmitted output, and reports the measured strength to the base station processor 201.

The RF characteristic analyzer 211 preferably monitors and analyzes the output signals of both the transmitted frequency band filter 208 and the received frequency converter 205. If it determines that the call quality may deteriorate, it transmits an alarm signal to the base station processor so that an appropriate measure can be taken before the call quality deteriorates.

Figure 3:
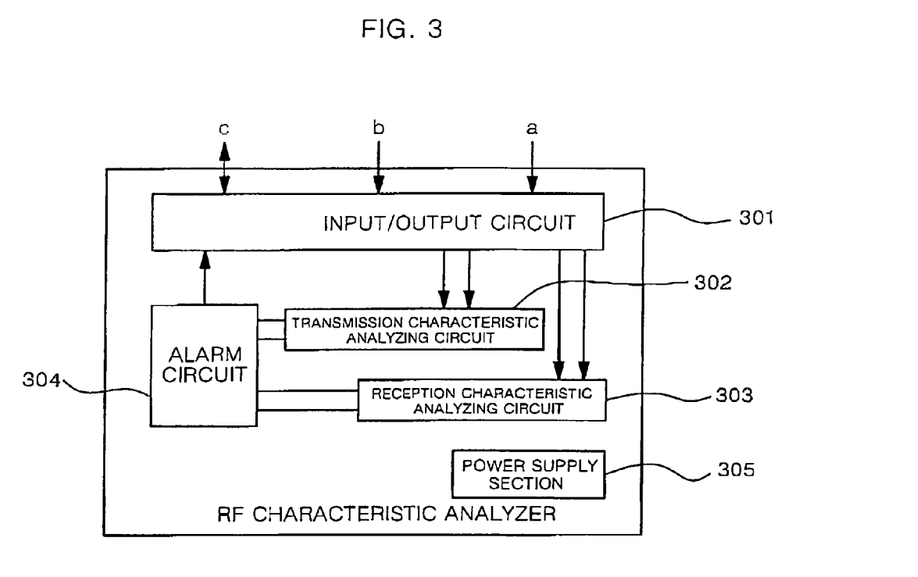
FIG. 3 is a block diagram illustrating the construction of an RF characteristic analyzer of FIG. 1.

Referring to FIG. 3, the RF characteristic analyzer employed in the CDMA base station according to the preferred embodiment comprises an input/output circuit 301, coupled to input/output the signals to be monitored, and to output the alarm signal. A transmission characteristic analyzing circuit 302 is provided to monitor and analyze the output signal of the transmitted frequency band filter 208 in real time, and a reception characteristic analyzing circuit 303 is provided to monitor and analyze the output signal of the received frequency converter 205 in real time. The RF characteristic analyzer further includes an alarm generating circuit 304, which preferably receives analyzed data from the transmission characteristic analyzing circuit 302 and the reception characteristic analyzing circuit 303, and generates an alarm message in accordance with the received data. Finally, a power supply circuit 500 is preferably provided to supply power to the RF characteristic analyzer.

Figure 4A:
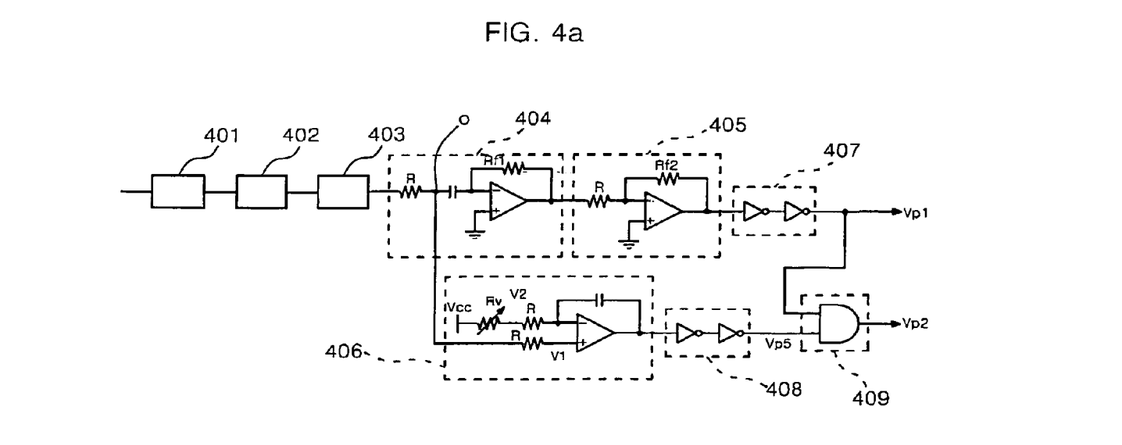
FIGS. 4a to 4c are circuit diagrams of constituent elements constituting the RF characteristic analyzer of FIG. 3.

Referring to FIG. 4a, a circuit diagram of the transmission characteristic analyzing circuit 302 is illustrated. The transmission characteristic analyzing circuit 302 preferably comprises a first filter 401, which is preferably a band rejection filter that eliminates a used base station transmission band signal. An analog-to-digital (A/D) converter 402 is also provided, and converts an analog signal passing through the first band rejection) filter 401 into a digital signal. Next, a second filter 403 is provided to remove a prescribed frequency component. The second filter 403 is preferably a low pass filter, to remove a high-frequency component, passing therethrough only a low frequency.

The circuit also preferably includes a differentiator 404 which determines whether a strength of a signal outputted from the A/D converter is gradually increased or decreased, and a sign changer 405 for changing a sign of an output signal of the differentiator. That is, if the signal received from the differentiator 404 is a negative number, the sign changer changes it to a positive number, while if the signal is a positive number, the sign changer changes it to a negative number.

The circuit also preferably includes an integrator 406 which outputs a positive integer value if the signal inputted thereto is larger than a specified threshold value, and noise removers 407 and 408 coupled to the sign changer 405 and the integrator 406, respectively, for removing input noises. Finally, the circuit preferably includes a logic gate 409 coupled to receive the outputs of each of the noise removers 407, 408.

Figure 4B:
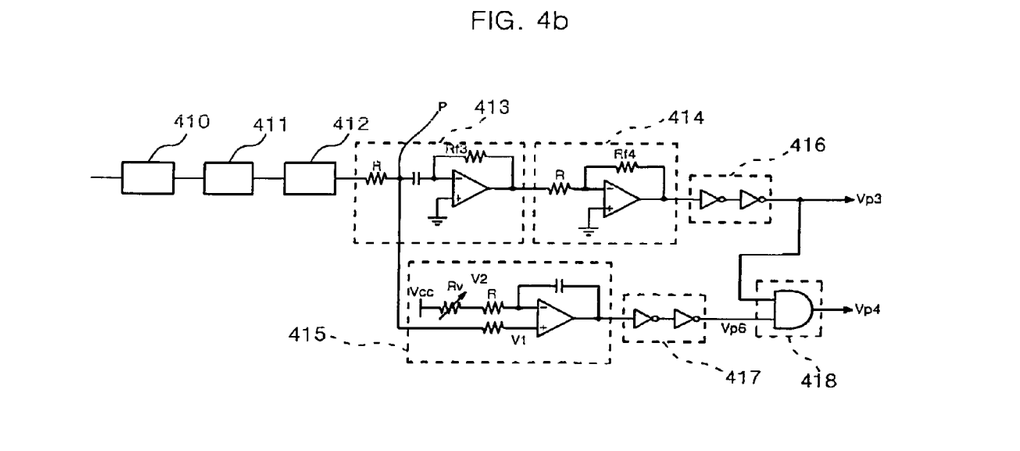

Referring to FIG. 4b, a circuit diagram of the reception characteristic analyzing circuit 303 is illustrated. The reception characteristic analyzing circuit 303 has the same construction as the transmission characteristic analyzing circuit 302, except that the first filter 410 is preferably a band pass filter for passing therethrough a prescribed band of frequencies. The bandwidth is preferably 5 MHz, including a received intermediate frequency (IF) band.

The operation of the RF characteristic analyzer used in the CDMA base station system according to a preferred embodiment of the present invention will next be described with reference to FIGS. 3, and 4a to 4c.

Figure 4C:
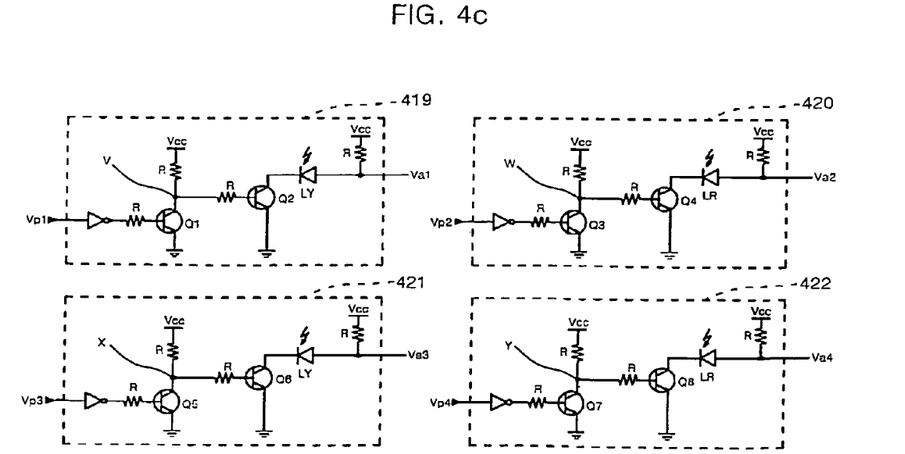

First, referring to FIGS. 4a and 4c, the operation of the base station transmission characteristic analyzing circuit 302 will be described. The transmitted signal is inputted to a monitoring port a of the base station through the input/output circuit 301. The signal then passes through the band rejection filter 401 of the transmission characteristic analyzing circuit 302. At this time, the positive signal, which is a normal signal existing in the actual band, is eliminated, and an unwanted wave signal, which includes unnecessary out-of-band signals, passes through the band rejection filter 401.

Preferably, the band rejection filter passes therethrough frequencies having the characteristics of ±1.25 MHz, ±1.98 MHz, ±2.25 MHz and greater than ±2.25 MHz from the used frequency of 1.23 MHz.

The unwanted wave signal is then converted into a digital signal by the A/D converter 402. The value of the digital signal is represented as a real number in proportion to the signal strength of the unwanted wave signal.

The output signal of the A/D converter 402 passes through the low pass filter 403 with its high-frequency component noise removed, and then passes through the differentiator 404. At this time, the output value of the differentiator is given by $$(-Rf_1)\frac{dVs}{dt} \qquad \text{[Equation 1]}$$

In Equation 1, "Rf1" denotes the value of a feedback resistor, and "Vs" denotes a voltage of the input terminal of the differentiator.

Using the above equation, the system determines whether the signal strength of the input terminal of the differentiator (i.e., the real number) is gradually increasing. At this time, if the strength is gradually increasing, the sign of the output value is a negative number.

The output of the differentiator 404 then passes through the sign changer 405. At this time, the output of the sign changer 405 is given by $$\left(\frac{-Rf_2}{-R}\right)(-Rf_1)\frac{dVs}{dt} \quad \text{[Equation 2]}$$

In Equation 2, "Rf2" denotes a feedback resistor, and $$"(-Rf_1)\frac{dVs}{dt}"$$

denotes the output value of the differentiator. By the above equation, the sign of the output value is changed. Thus, if the sign were a negative value, it would change to a positive value. Specifically, the sign of the output value becomes positive if the unwanted wave of the base station transmission characteristic is gradually increasing, while otherwise, it becomes negative.

After passing through the sign changer 405, the signal is inputted to the noise remover 407, and an output value Vp1 is outputted from the noise remover 407 with its sign clarified. In other words, if the unwanted wave is gradually increasing, an accurate high-level (i.e., 5V) value is inputted to the input terminal of the alarm circuit 419.

The alarm circuit 419 receives the output value Vp1. If the output value Vp1 is "high", the power supply Vcc is applied to a node V of the alarm circuit 419 to initiate a first indicator, for example turning on a yellow LED LY. A "high" signal is sent to node Va1 of the alarm circuit 419, and a first alarm message is consequently transmitted to the base station processor 201 through the input/output circuit 301.

Meanwhile, the signal on a node O of the differentiator 404 is inputted to the integrator 406. The output function of the integrator is expressed by $$\frac{1}{(R_v + R)}\int (V1 - V2)dt \quad \text{[Equation 3]}$$

In Equation 3, "R" denotes the value of a resistor connected to a terminal V2 of an amplifier in the differentiator, "V2" denotes a threshold value determined by varying the value Rv in the integrator 406, and "V1" denotes an input signal of the integrator 406.

At this time, if the input signal V1 of the integrator 406 is greater than the threshold value V2, its output value becomes a positive real value. This positive real value is inputted to the noise remover 408, and an output value Vp5 is outputted from the noise remover 408 with its sign clarified.

Then, the output values Vp1 and Vp5 are inputted to the logic gate 409, and a value Vp2 is outputted from the logic gate 409. Specifically, if both of the two signals are "high," i.e., if the unwanted wave is gradually increasing and the signal strength of the unwanted wave exceeds a predetermined value, the value Vp2 becomes "high." The value Vp2 is then inputted to the alarm circuit 420, and thus a red LED LR is turned on, and a second alarm message is transmitted to the base station processor 201 through the input/output circuit 301.

Next, the operation of the reception characteristic analyzing circuit 303 will be described with reference to FIGS. 4b and 4c.

First, the signal from the received frequency converter 205 is inputted to a monitoring port b of the base station through the input/output circuit 301. The signal then passes through the band pass filter 410 of the reception characteristic analyzing circuit 303. At this time, the 5 MHz band, including the IF band, passes through the band pass filter 410.

The ensuing process of receiving the signal passing through the band pass filter 410 and analyzing the reception characteristic thereby is the same as that performed by the transmission characteristic analyzing circuit, and thus the detailed explanation thereof will be incorporated by reference.

As described above, the CDMA base station system as described herein has several advantages. For example, the call quality can be improved by receiving an advanced alarm message before any problem occurs in the base station, and thus enabling an appropriate measure to be taken. Also, the RF characteristic analysis can be performed by the base station itself without the necessity of a separate measuring equipment.

Further, the base station characteristic change can be confirmed during the reliability test of the base station, and thus the system can be usefully adopted in mass production, thereby ensuring reliability.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A code division multiple access (CDMA) base station system, comprising:
    a channel card, configured to modulate and output a first signal and receive and demodulate a second signal;
    a transmitter configured to transmit the first signal outputted from the channel card through a first antenna;
    a receiver configured to receive a signal from a second antenna and provide the received signal to the channel card;
    a radio frequency (RF) characteristic analyzer, configured to monitor output signals of the transmitter and the receiver and analyze characteristics of the transmitter and the receiver, and generate a result of the monitoring and analysis;
    a first processor configured to provide an interface among the channel card, the transmitter, the receiver, and the RF characteristic analyzer and to receive the result from RF characteristic analyzer;
    a power level measuring device, to measure a power level of a final end of the base station, and provide the power level to the first processor; and
    a second processor, configured to provide an interface between the first processor and an exchange,
    wherein the RE characteristic analyzer comprises:
    a first analyzing circuit to monitor and analyze the output signal of the transmitter;
    a second analyzing circuit for monitoring and analyzing the output signal of the receiver; and
    an alarm circuit to receive analyzed data from the first and second analyzing circuits and generate an alarm signal.

2. The system of claim 1, wherein the RE characteristic analyzer further comprises:

an input/output circuit configured to communicatively couple the RE characteristic analyzer with the first processor; and a power supply to supply power to the RE characteristic analyzer.

3. The system of claim 2, wherein the first analyzing circuit comprises:

a first filter configured to receive the output signal of the transmitter and filter a specified signal band;

an analog-to-digital convener coupled to receive an analog output signal of the first filter and convert it into a digital signal;

a second filter coupled to receive an output signal from the analog-to-digital converter and pass therethrough only a prescribed frequency of the output signal;

a differentiator coupled to receive an output of the second filter and determine whether a strength of the signal outputted from the analog-to-digital converter is increasing;

a sign changer coupled to receive an output signal of the differentiator and change a sign of the output signal of the differentiator;

an integrator coupled to receive the output of the second filter and output a positive integer value if the output signal of the second filter is greater than a prescribed value; and a logic gate coupled to logically combine an output signal of the sign changer and an output of the integrator.

4. The system of claim 3, wherein the first filter is a band rejection filter and the second filter is a low pass filter.

5. The system of claim 2, wherein the second analyzing circuit comprises:

a first filter configured to receive the output signal of the receiver and pass only a first prescribed signal band;

an analog-to-digital converter coupled to receive the band signal and convert it to a digital signal;

a second filter coupled to receive the digital signal and pass therethrough only a second prescribed frequency of the digital signal;

a differentiator coupled to receive an output signal of the second filter and determine whether a strength of the digital signal is increasing;

a sign changer coupled to receive an output signal of the differentiator and change a sign of the output signal of the differenriator;

an integrator coupled to receive the output of the second filter and output a positive integer value if the output signal of the second filter is greater than a prescribed value; and a logic gate coupled to logically combine an output signal of the sign changer and an output of the integrator.

6. The system of claim 5, wherein the first filter is a band pass filter and the second filter is a low pass filter.

7. The system of claim 2, wherein the first analyzing circuit monitors and analyzes the output of the transmitter in real time, and wherein the second analyzing circuit monitors and analyzes the output of the receiver, in real time.

8. A code division multiple access (CDMA) base station system, comprising:

a transmitter configured to modulate and transmit a first signal through a first antenna, said first signal passing through a transmission frequency band filter;

a receiver configured to receive and demodulate a second signal through a second antenna, said second signal being converted to a frequency band by a receiving frequency converter;

a radio frequency (RF) characteristic analyzer coupled to monitor and analyze an output signal of each of the transmitter and the receiver and determine an extent of signal degradation, and to provide a monitoring signal based on the level of degradation, the RF characteristic analyzer comprising a first analyzing circuit including a first analog-to-digital (A/D) converter coupled to convert an output of the frequency band filter into a digital signal, and a second analyzing circuit that includes a second A/D converter coupled to convert an output of the frequency converter into a digital signal, wherein the RF characteristic analyzer is coupled to the frequency band filter and the receiving frequency converter and includes transmission and reception band rejection filters to respectively filter out unwanted signals outputted from the frequency band filter and the receiving frequency converter, the RF characteristic analyzer determining whether the unwanted signals are increasing or decreasing, and wherein the first analyzing circuit and the second analyzing circuit further comprise:

a differentiator coupled to receive the digital output signal of the associated first or second A/D converter and generate a differentiated output signaL an integrator coupled to receive the digital output signal of the associated first or second A/D converter and generate an integrated output signal.

9. The system of claim 8, wherein the RF characteristic analyzer further comprises:

an alarm circuit coupled to receive analyzed data from the first and second analyzing circuits, and generate the monitoring signal.

10. The system of claim 9, wherein the first analyzing circuit further comprises:

a band rejection filter coupled to receive the transmitter output signal and filter out a prescribed band of the signal;

a first low pass filter coupled to the A/D converter to pass only a low frequency digital signal;

a first signal processor coupled to determine whether a strength of the low frequency digital signal is increasing;

a first output circuit coupled to change a sign of an output signal of the first signal processor and generate a first output signal;

a second signal processor coupled to determine if the strength of the low frequency digital signal is greater than a prescribed threshold value; and a second output circuit coupled to logically combine the flit output signal with an output of the second signal processor and generate a second output signal.

11. The system of claim 10, wherein the second analyzing circuit further comprises:

a band pass filter coupled to receive the receiver output signal and pass only a prescribed band of the signal;

a second low pass filter coupled to the A/D convener to pass only a low frequency digital signal;

a third signal processor coupled to determine whether a strength of the low frequency digital signal is increasing;

a third output circuit coupled to change a sign of an output signal of the third signal processor and generate a third output signal;

a fourth signal processor coupled to determine if the strength of the low frequency digital signal is greater than a prescribed threshold value; and a fourth output circuit coupled to logically combine the third output signal with an output of the fourth signal processor to generate a fourth output signal.

12. The system of claim 11, wherein the alarm circuit generates a first monitoring signal in response to the first output signal, a second monitoring signal in response to the second output signal, a third monitoring signal in response to the third output signal, and a fourth monitoring signal in response to the fourth output signal.

13. The system of claim 11, wherein the first and third signal processors each comprise a differentiator, the second and fourth signal processors each comprise an integrator, and the second and fourth output circuits comprise an AND gate.

14. A radio frequency (RF characteristic analyzer for a communications system, comprising:
   an input/output module, coupled to the communications system;
   a first analyzing circuit coupled to receive and analyze a transmission signal of the communications system through the input/output module;
   a second analyzing circuit coupled to receive and analyze a reception signal of the communications system through the input/output module; and
   an alarm circuit coupled to receive analyzed data from the first and second analyzing circuits, and configured to provide at least one alarm message according to the analyzed data,
   wherein the first analyzing circuit comprises:
   an analog-to-digital (A/D) converter coupled to receive the transmission signal and convert it into a digital output signal;
   a differentiator coupled to receive the digital output signal of the A/D converter and generate a differentiated output signal;
   an integrator coupled to receive the digital output signal of the A/D converter and generate an integrated output signal.

15. The analyzer of claim 14, further comprising a channel card coupled to modulate the transmission signal and demodulate the reception signal, a transmitter to transmit the modulated transmission signal through a transmitting antenna, a receiver to receive a signal demodulated by the channel card, a first processor to provide an interface among the channel card, the transmitter, the receiver, and the input/output module, and a second processor to provide an interface between the first processor and an exchange.

16. The analyzer of claim 14, wherein the first analyzing circuit further comprises:
   a band rejection filter coupled to receive and filter the transmission signal and to provide a filtered signal having a prescribed band of frequencies to the A/D converter;
   a low pass filter coupled to receive the digital output signal of the A/D converter and provide a low frequency digital signal to each of the differentiator and integrator;
   a sign changer coupled to receive the differentiated output signal of the differentiator and change the sign of the differentiated output signal to provide first analyzed data; and
   a logic gate coupled to logically combine an output signal of the sign changer and the integrated output signal of the integrator to provide second analyzed data.

17. The analyzer of claim 16, wherein the first analyzed data indicates whether a signal strength of an unused band of frequencies is increasing, and the second analyzed data indicates whether the signal strength of the unused band of frequencies is increasing and exceeds a prescribed value.

18. The analyzer of claim 16, wherein the differentiated output signal indicates whether a strength of the digital output signal is increasing and the integrated output signal indicates whether the strength of the digital output signal is greater than a prescribed value.

19. The analyzer of claim 14, wherein the second analyzing circuit comprises:
   an analog-to-digital (A/D) converter coupled to receive the reception signal and convert it into a digital output signal;
   a differentiator coupled to receive the digital output signal of the A/D converter and generate a differentiated output signal;
   an integrator coupled to receive the digital output signal of the A/D converter and generate an integrated output signal.

20. The analyzer of claim 19, wherein the second analyzing circuit further comprises:
   a band pass filter coupled to receive and filter the reception signal and to provide a filtered signal having a prescribed band of frequencies to the A/D converter;
   a low pass filter coupled to receive the digital output signal of the A/D converter and provide a low frequency digital signal to each of the differentiator and integrator;
   a sign changer coupled to receive the differentiated output signal of the differentiator and change the sign of the differentiated output signal to provide first analyzed data; and
   a logic gate coupled to logically combine an output signal of the sign changer and the integrated output signal of the integrator to provide second analyzed data.

21. The analyzer of claim 20, wherein the first analyzed data indicates whether a signal strength of an unused band of frequencies is increasing, and the secondanalyzed data indicates whether the signal strength of the unused band of frequencies is increasing and exceeds a prescribed value.

22. The analyzer of claim 20, wherein the differentiated output signal indicates whether a strength of the digital output signal is increasing and the integrated output signal indicates whether the strength of the digital output signal is greater than a prescribed value.

23. A base station system, comprising:
   a radio frequency (RF) characteristic analyzer configured to monitor and analyze output signals of a transmission frequency band filter and a receiving frequency converter so as to determine if a call quality of the base station is going to, the RF characteristic analyzer comprising a first analyzing circuit including a first analog-to-digital (A/D) converter coupled to convert an output of the frequency band filter into a digital signal, and a second analyzing circuit that includes a second A/D converter coupled to convert an output of the frequency converter into a digital signal; and
   an alarm circuit configured to generate at least one alarm if the RF characteristic analyzer determines the call quality is going to deteriorate,
   wherein the RF characteristic analyzer is coupled to the frequency band filter and the receiving frequency converter and includes transmission and reception band rejection filters to respectively filter out unwanted signals outputted from the frequency band filter and the receiving frequency converter, the RF characteristic analyzer determining whether the unwanted signals are increasing or decreasing wherein the first analyzing circuit and the second analyzing circuit further comprise:
a differentiator coupled to receive the digital output signal of the associated first or second A/D converter and generate a differentiated output signal;
an integrator coupled to receive the digital output signal of the associated first or second A/D converter and generate an integrated output signal.

24. The system of claim 23, wherein the RF characteristic analyzer determines if the call quality is going to deteriorate by analyzing RF characteristics of the transmission frequency band filter and the receiving frequency converter.

25. The system of claim 23, wherein the RE characteristic analyzer analyzes unwanted wave signals that includes an out-of-band signal transmitted by the base station.

26. The system of claim 25, wherein the unwanted wave signals have frequencies of ±1.25 MHZ, ±1.98 MHZ, ±2.25 MHZ and greater than ±2.25 MHZ when the band frequency is 1.23 MHZ.

27. The system of claim 25, wherein the alarm circuit generates the at least one alarm if a signal strength of the out-of-band signal increases beyond a predetermined level.

* * * * *